(12) United States Patent
Beaurepaire et al.

(10) Patent No.: US 10,234,297 B2
(45) Date of Patent: Mar. 19, 2019

(54) APPARATUS AND ASSOCIATED METHOD FOR PROVIDING U-TURN GUIDANCE

(71) Applicant: HERE GLOBAL B.V., Eindhoven (NL)

(72) Inventors: Jerome Beaurepaire, Berlin (DE); Jarmo Juhani Kemppainen, Berlin (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 15/533,935

(22) PCT Filed: Dec. 10, 2014

(86) PCT No.: PCT/EP2014/077269
§ 371 (c)(1),
(2) Date: Jun. 7, 2017

(87) PCT Pub. No.: WO2016/091306
PCT Pub. Date: Jun. 16, 2016

(65) Prior Publication Data
US 2017/0336218 A1 Nov. 23, 2017

(51) Int. Cl.
*G01C 21/34* (2006.01)
*G01C 21/36* (2006.01)
(Continued)

(52) U.S. Cl.
CPC ....... *G01C 21/3415* (2013.01); *G01C 21/362* (2013.01); *G01C 21/3626* (2013.01);
(Continued)

(58) Field of Classification Search
CPC .............. G01C 21/3415; G01C 21/362; G01C 21/3626; G01C 21/3629; G01C 21/3632;
(Continued)

(56) References Cited

U.S. PATENT DOCUMENTS 5,508,930 A 4/1996 Smith, Jr.
6,321,161 B1 11/2001 Herbst et al.
(Continued)

FOREIGN PATENT DOCUMENTS

EP 1 906 199 A1 4/2008
EP 1772339 B1 12/2008
(Continued)

OTHER PUBLICATIONS

Richard et al., "Driver Attitudes and Behaviors at Intersections and Potential Effectiveness of Engineering Countermeasures", Technical Report, Nov. 2005, 173 Pages.
(Continued)

*Primary Examiner* — Gertrude Arthur Jeanglaude
(74) *Attorney, Agent, or Firm* — Ditthavong & Steiner, P.C.

(57) ABSTRACT

An apparatus comprising a processor and memory including computer program code, the memory and computer program code configured to, with the processor, enable the apparatus at least to:
receive an indication of disruption to a planned route of travel for a road vehicle following the planned route;
based on consideration of contextual data in respect of a location in proximity to the current vehicle location against one or more predefined manoeuvering criteria, dynamically identify a U-turn location on the planned route of travel at which it is possible for the vehicle to perform a U-turn onto a different route of travel; and
provide an indication of the dynamically identified U-turn location for use in route navigation onto the different route of travel.

20 Claims, 6 Drawing Sheets

(51) Int. Cl.
G08G 1/0968 (2006.01)
G08G 1/16 (2006.01)
G05D 1/02 (2006.01)
(52) U.S. Cl.
CPC ..... *G01C 21/3629* (2013.01); *G01C 21/3632* (2013.01); *G01C 21/3691* (2013.01); *G05D 1/0212* (2013.01); *G08G 1/096827* (2013.01); *G08G 1/096844* (2013.01); *G08G 1/096861* (2013.01); *G08G 1/165* (2013.01); *G08G 1/166* (2013.01); *G08G 1/167* (2013.01)
(58) Field of Classification Search
CPC ............. G01C 21/3691; G05D 1/0212; G08G 1/096827; G08G 1/096844; G08G 1/096861; G08G 1/165; G08G 1/166
USPC .............................................. 701/24, 25, 36
See application file for complete search history.

(56) References Cited

U.S. PATENT DOCUMENTS

| | | | |
|---|---|---|---|
| 8,610,595 | B1 | 12/2013 | Aleteeby |
| 9,467,293 | B1 | 10/2016 | Brainard et al. |
| 9,672,734 | B1* | 6/2017 | Ratnasingam ....... G08G 1/0112 |
| 2006/0069501 | A1* | 3/2006 | Jung ................ G08G 1/096816 701/457 |
| 2007/0010938 | A1 | 1/2007 | Kubota et al. |
| 2008/0007428 | A1 | 1/2008 | Watanabe et al. |
| 2008/0208466 | A1 | 8/2008 | Iwatani |
| 2009/0119003 | A1 | 5/2009 | Takeda |
| 2010/0023183 | A1 | 1/2010 | Huang et al. |
| 2010/0253489 | A1 | 10/2010 | Cui et al. |

FOREIGN PATENT DOCUMENTS

| | | |
|---|---|---|
| EP | 2 397 868 A1 | 12/2011 |
| WO | 2010/094252 A1 | 8/2010 |

OTHER PUBLICATIONS

Torkkola et al., "Sensor Selection for Maneuver Classification", Proceedings of the 7th International IEEE Conference on Intelligent Transportation Systems, Apr. 30, 2004, 6 Pages.

Notification of Transmittal of The International Search Report and The Written Opinion of The International Searching Authority, or The Declaration; International Search Report, and Written Opinion of The International Searching Authority for corresponding International Application No. PCT/EP2018/067013, dated Aug. 9, 2018, 15 pages.

Menezes et al., "Chapter 10: Identification and Entity Authentication", Handbook of Applied Cryptography, Oct. 1996, retrieved from http://cacr.uwaterloo.ca/hac/about/chap10.pdf, 41 pages.

* cited by examiner

APPARATUS AND ASSOCIATED METHOD FOR PROVIDING U-TURN GUIDANCE

CROSS-REFERENCES TO RELATED APPLICATIONS

This application claims priority from PCT Application Serial No. PCT/EP2014/077269, filed on Dec. 10, 2014, the contents of which are hereby incorporated herein in their entirety by this reference.

TECHNICAL FIELD

The present disclosure relates to the field of route navigation, associated methods and apparatus, and in particular concerns an apparatus configured to dynamically identify a location on a planned route of travel at which it is possible for a road vehicle to perform a U-turn onto a different route of travel. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), smartwatches, smart eyewear and tablet PCs. In some example embodiments, the apparatus may be built in to a vehicle, for example, as part of a (e.g. satellite) navigation system.

The portable electronic devices/apparatus according to one or more disclosed example aspects/embodiments may not be limited to just navigation/road mapping functionality but may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop improved navigation devices which can provide a user with more detailed information about road networks to further aid route navigation.

One or more aspects/embodiments of the present disclosure may or may not address this issue.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:
receive an indication of disruption to a planned route of travel for a road vehicle following the planned route;
based on consideration of contextual data in respect of a location in proximity to the current vehicle location against one or more predefined manoeuvering criteria, dynamically identify a U-turn location on the planned route of travel at which it is possible for the vehicle to perform a U-turn onto a different route of travel; and
provide an indication of the dynamically identified U-turn location for use in route navigation onto the different route of travel.

The one or more predefined manoeuvering criteria may comprise manoeuvering space, and the apparatus may be configured to dynamically identify the U-turn location based on consideration of at least one of the following pieces of contextual data: the size or shape of the vehicle, the width of the road in proximity to the current vehicle location, and the presence of a parked vehicle at the side of the road in proximity to the current vehicle location.

The one or more predefined manoeuvering criteria may comprise manoeuvering obstruction, and the apparatus may be configured to dynamically identify the U-turn location based on consideration of at least one of the following pieces of contextual data: the presence of a moving or stationary vehicle on the road in proximity to the current vehicle location, the presence of a central reservation separating inbound and outbound lanes in proximity to the current vehicle location, and the presence of a pedestrian or pedestrian crossing in proximity to the current vehicle location.

The one or more predefined manoeuvering criteria may comprise manoeuvering safety, and the apparatus may be configured to dynamically identify the U-turn location based on consideration of at least one of the following pieces of contextual data: the geometry of the road in proximity to the current vehicle location, the presence of a road intersection in proximity to the current vehicle location, and the presence of a visibility obstruction in proximity to the current vehicle location.

The one or more predefined manoeuvering criteria may comprise manoeuvering convenience, and the apparatus may be configured to dynamically identify the U-turn location based on consideration of at least one of the following pieces of contextual data: the number of inbound and outbound lanes forming the road in proximity to the current vehicle location, and the presence of traffic behind the vehicle or on the other side of the road in proximity to the current vehicle location.

The one or more predefined manoeuvering criteria may comprise manoeuvering legality, and the apparatus may be configured to dynamically identify the U-turn location based on consideration of the presence of a predefined legal traffic restriction in proximity to the current vehicle location.

The apparatus may be configured to:
determine how to perform the U-turn at the U-turn location based on the contextual data; and
provide an indication of how to perform the U-turn for use in guidance from the planned route of travel onto the different route of travel.

Determining how to perform the U-turn may comprise determining one or more of a minimum number of manoeuvres required to perform the U-turn, an inbound lane at the U-turn location in which to initiate the U-turn, and an outbound lane at the U-turn location in which to complete the U-turn.

The indication of how to perform the U-turn may comprise one or more of a visual indication, an audio indication and computer readable instructions for a driverless vehicle to perform the U-turn.

The visual indication may comprise one or more of markers, lines, arrows and zones, and the audio indication comprises instructions, configured to provide guidance from the planned route of travel onto the different route of travel.

The contextual data may comprise one or more of map data, real-time sensor data, and pre-stored data. Examples of sensors for providing the contextual data, in respect of the current location of the vehicle and the vehicle proximity could include GPS sensors, compass sensors, accelerometer sensors, altimeter sensors and camera sensors.

Disruption to the planned route of travel may comprise one or more of a deliberate change in route to the same destination or a deliberate change to a different destination, a traffic incident in respect of the planned route of travel including one or more of a road or lane closure, a road or lane blockage, a traffic accident, a vehicle breakdown and road works on the planned route, and adverse weather conditions on the planned route.

The indication of disruption may be received via one or more of a driver or passenger of the vehicle, an operator associated with and located remote to the apparatus or vehicle, a traffic update and a weather update.

The contextual data may be in respect of a location within a predefined distance of the current vehicle location on the planned route of travel, or a predefined distance on the planned route before the location of the disruption.

The predefined distance may be one or more of 100 ft, 100 yd, 100 m, 200 ft, 200 yd, 200 m, 300 ft, 300 yd, 300 m, 500 ft, 500 yd, 500 m, 1 km and 1 mile of the current vehicle location or disruption.

The U-turn may comprise one or more of a direct U-turn, a turn-in-the-road, a three-point turn, a five-point turn, a seven-point turn and an n-point turn.

The indication of the dynamically identified U-turn location may be configured for use by one or more of a driver or passenger of the vehicle, an operator associated with and located remote to the apparatus or vehicle, and the vehicle itself.

The apparatus may be one or more of an electronic device, a portable electronic device, a portable telecommunications device, a satellite navigation device, a mobile phone, a personal digital assistant, a tablet, a phablet, a desktop computer, a laptop computer, a server, a smartphone, a smartwatch, smart eyewear, a heads-up display for the vehicle, the vehicle itself, a driver vehicle, a driverless vehicle, and a module for one or more of the same.

According to a further aspect, there is provided a method comprising:
  receiving an indication of disruption to a planned route of travel for a road vehicle following the planned route;
  based on consideration of contextual data in respect of a location in proximity to the current vehicle location against one or more predefined manoeuvering criteria, dynamically identifying a U-turn location on the planned route of travel at which it is possible for the vehicle to perform a U-turn onto a different route of travel; and
  providing an indication of the dynamically identified U-turn location for use in route navigation onto the different route of travel.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means or functional units for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

Satellite navigation devices currently provide little guidance on where to perform a U-turn in the event of disruption to a planned route of travel. In some scenarios, it may not be safe, legal or even possible to perform a U-turn at the current location. This can create confusion on the road which may lead to traffic accidents or violations. There will now be described an apparatus and associated methods that may provide a possible solution. The advantages disclosed herein are applicable both to driver vehicles as well as driverless vehicles.

Figure 1:
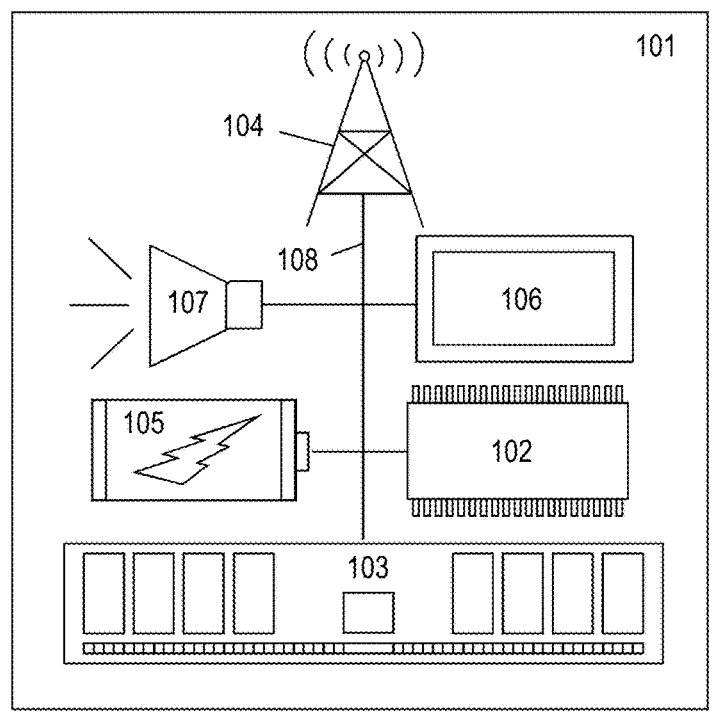
FIG. 1 illustrates schematically an apparatus configured to perform one or more methods described herein.

FIG. 1 shows an apparatus 101 configured to perform one or more methods described herein. The apparatus 101 may be at least one of an electronic device, a portable electronic device, a portable telecommunications device, a navigation device, a satellite navigation device, a mobile phone, a personal digital assistant, a smartphone, a smartwatch, smart eyewear, a phablet, a tablet, a laptop computer, a desktop computer, an or a non-embedded vehicle navigation device, a server, a heads-up display for a vehicle, a manual vehicle, an autonomous vehicle, a semi-autonomous vehicle, and a module for one or more of the same. The term "driverless vehicle" comprises autonomous and semi-autonomous vehicles and may be operated by a co-located (e.g. within the vehicle) and/or a remotely located (e.g. a remote server) vehicle controller. The term "driver vehicles" comprises manual vehicles (which may have a manual or automatic gearbox) and semi-autonomous vehicles. The navigation device may or may not be part of a vehicle navigation system. That is, the vehicle navigation system may be built-in to a vehicle in certain embodiments, although in other embodiments may be removable from the vehicle. Not all elements of the navigation device need to be in the vehicle as, in some embodiments, one or more aspects of the navigation functionality may be provided by one or more servers/apparatus remote from the vehicle.

In this example, the apparatus 101 comprises a processor 102, a memory 103, a transceiver 104, a power supply 105, an electronic display 106 and a loudspeaker 107, which are electrically connected to one another by a data bus 108. The processor 102 is configured for general operation of the apparatus 101 by providing signalling to, and receiving signalling from, the other components to manage their operation. The memory 103 is configured to store computer program code configured to perform, control or enable operation of the apparatus 101. The memory 103 may also be configured to store settings for the other components. The processor 102 may access the memory 103 to retrieve the component settings in order to manage the operation of the other components. The processor 102 may be a microprocessor, including an Application Specific Integrated Circuit (ASIC). The memory 103 may be a temporary storage medium such as a volatile random access memory. On the other hand, the memory 103 may be a permanent storage medium such as a hard disk drive, a flash memory, or a non-volatile random access memory.

The transceiver 104 is configured to transmit data to, and/or receive data from, other apparatus/devices, whilst the power supply 105 is configured to provide the other components with electrical power to enable their functionality, and may comprise one or more of a battery, a capacitor, a supercapacitor, and a battery-capacitor hybrid. The electronic display 106 may be an LED, LCD or plasma display, and is configured to display visual content which is stored on (e.g. on the storage medium) or received by (e.g. via the transceiver) the apparatus 101. Similarly, the loudspeaker 107 is configured to output audio content which is stored on or received by the apparatus 101. The visual and audio content may comprise related components of a combined audio visual content. In some examples, the audio and/or visual content may comprise navigational content (such as geographical information and directions, distances, speeds or times of travel). In other embodiments, the display 106, loudspeaker 107 and any user interface components may be remote to, but in communication with, the apparatus 101 rather than forming part of the apparatus 101. Further, in other embodiments, the power supply 105 may be housed separately from the apparatus 101, and may be mains power.

Figure 2:
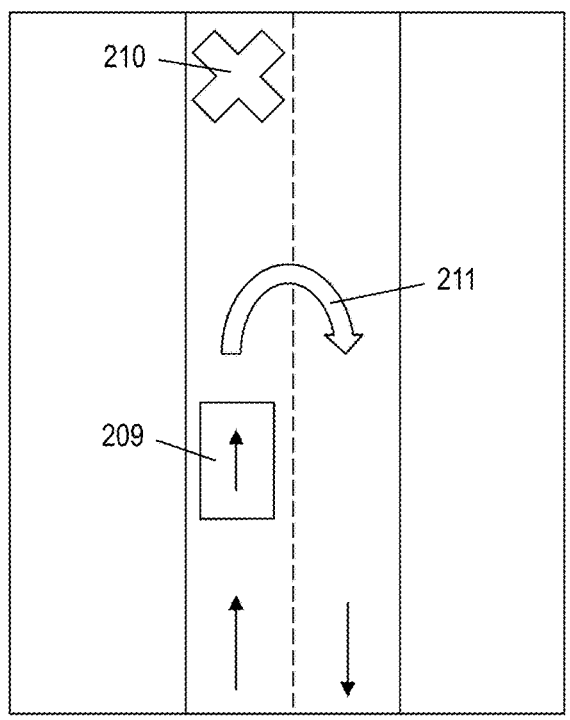
FIG. 2 illustrates schematically an example of a scenario in which it may be desirable to perform a U-turn onto a different route of travel.

FIG. 2 shows one example of a situation in which it may be desirable to perform a U-turn onto a different route of travel. In this example, a vehicle 209 follows a planned route of travel until there is some kind of disruption 210 to the planned route. The route may be planned in the sense of, for example, a route which is programmed into the navigation device (or route controller) for the vehicle. In the case of a driverless vehicle, for example, this is the route that is being followed by the vehicle based on the vehicle controller (configured by, for example, a computer program) which controls the vehicle route. In the case of a driver operated vehicle, this is the route for which guidance is being delivered, based on, for example, a destination entered into the navigation device by the driver.

The disruption 210 may be anything which requires an about-turn by the vehicle 209, such as a deliberate change in route to the same destination or a deliberate change to a different destination, a traffic incident in respect of the planned route of travel including one or more of a road or lane closure, a road or lane blockage, a traffic accident, a vehicle breakdown and roadworks on the planned route, and adverse weather conditions on the planned route. In this scenario, the driver of the vehicle 209 (in the case of manual vehicles), an operator remotely controlling the vehicle 209 (in the case of remote-controlled vehicles) or the vehicle 209 itself (in the case of autonomous or semi-autonomous vehicles) may need to perform a U-turn 211 in order to address the route disruption 210. The term "U-turn" as used herein may be taken to mean any kind of manoeuvre which turns the vehicle 209 in substantially the opposite direction (e.g. an angular change of ±150-180°) from the current direction of travel, and includes one or more of a direct U-turn, a turn-in-the-road, a three-point turn, a five-point turn, a seven-point turn and an n-point turn. In this respect, a "direct U-turn" may be considered to be a single continuous manoeuvre (i.e. a classic U-turn), whilst a "turn-in-the-road" and "n-point turn" may be considered to involve any number of linked manoeuvres.

As mentioned above, it can be difficult to determine whether or not it is possible, safe or legal to perform a U-turn 211 at a particular location. This issue is addressed as described below. In the following description, each step of the method is performed by the apparatus 101 of FIG. 1, but it will be appreciated that some steps could be performed by another apparatus in collaboration with the apparatus 101 of FIG. 1.

The apparatus 101 is configured to receive an indication of disruption 210 to the planned route of travel for a road vehicle 209 following the planned route, and dynamically identify a U-turn location on the planned route at which it is possible for the vehicle 209 to perform a U-turn 211 onto a different route of travel. An indication of the dynamically identified U-turn location can then be provided by the apparatus 101 for use in route navigation onto the different route of travel. The indication of disruption 210 may be received via one or more of a driver or passenger of the vehicle 209, an operator associated with and located remote to the apparatus 101 or vehicle 209, map data, camera data, a traffic update and a weather update. One or more of the map data, camera data, traffic update and weather update data may be crowd-sourced. Similarly, the indication of the dynamically identified U-turn location may be configured for use by one or more of a driver or passenger of the vehicle 209, an operator associated with and located remote to the apparatus 101 or vehicle 209, and the vehicle 209 itself.

Identification of the U-turn location is based on consideration of contextual data in respect of a location in proximity to the current vehicle location against one or more predefined manoeuvering criteria. The contextual data comprises information on the vehicle 209 and its proximal environment and may include at least one of map data, real-time sensor data and pre-stored data. The map data may comprise details of the road network in proximity to the current vehicle location, such as road geometries, road widths, the number of lanes, road intersections, central reservations, pedestrian crossings, and predefined traffic restrictions. The real-time sensor data, on the other hand, may comprise information on aspects of the road network in proximity to the current vehicle location which vary with time, such as moving, stationary or parked vehicles, pedestrians and weather conditions. In addition, the pre-stored data may comprise any information which is already known about the vehicle (or its proximal environment), such as the dimensions and turning circle of the vehicle. Further examples are given below.

The contextual data may be in respect of a location within a predefined distance of the current vehicle location on the planned route of travel, or a predefined distance on the planned route before the location of the disruption 210. The predefined distance, which may be pre-stored, may comprise one or more of 100 ft, 100 yd, 100 m, 200 ft, 200 yd, 200 m, 300 ft, 300 yd, 300 m, 500 ft, 500 yd, 500 m, 1 km and 1 mile of the current vehicle location or disruption (for example).

By consideration of contextual data, the apparatus 101 is able to identify a suitable location on the planned route of travel at which a U-turn 211 can be performed safely and legally. This reduces uncertainty associated with the manoeuvre and may therefore help to decrease the likelihood of traffic accidents or violations associated with U-turns 211.

The apparatus 101 may be configured to consider the contextual data against a number of different predefined manoeuvering criteria. These criteria may include manoeuvering space, manoeuvering obstruction, manoeuvering safety, manoeuvering convenience and manoeuvering legality.

Figure 3A:
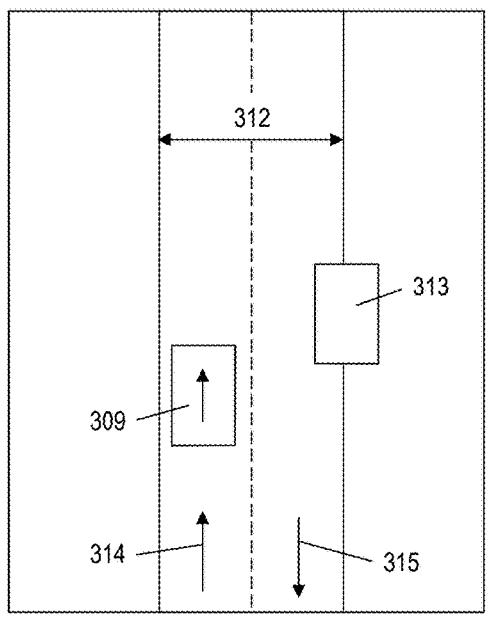
FIG. 3a illustrates schematically examples of contextual data for use in assessing manoeuvering space.

FIG. 3a illustrates schematically some examples of contextual data for use in assessing manoeuvering space. As the name suggests, the manoeuvering space criterion is used to determine whether or not there is sufficient space available at a particular location on the planned route in which to physically perform a U-turn. The amount of space required will depend on the particular type of U-turn being performed. For example, a greater amount of manoeuvering space is typically required in order to carry out a direct U-turn than a three-point turn, both of which normally require more manoeuvering space than a five-point turn. In this respect, the apparatus 101 may be configured to consider more than one type of U-turn in the identification of a suitable U-turn location.

In order to assess whether or not there is sufficient manoeuvering space available at a particular location, the apparatus may take into account the size or, shape and/or turning radius of the vehicle 309 in combination with the width 312 of the road in proximity to the current vehicle location. The vehicle 309 dimensions may be obtained from data which is stored on the memory 103 of the apparatus 101, and the road width 312 may be determined from received or stored map data corresponding to that particular section of the road network. As illustrated in FIG. 3a, the presence of vehicles 313 parked at the side of the road may also be taken into account, as this can reduce the amount of space that would otherwise be available for performing a U-turn at that location. This additional information could be obtained, for example, from one or more proximity sensors, such as a radar, laser scanner, light radar, ultra sound radar and/or camera, and/or a vehicle-to-vehicle (V2V) communication data configured to monitor the location. Given that vehicles 313 may be parked on either side of the road, however, it is important that any such sensors are configured to monitor both the inbound 314 and outbound 315 lanes in proximity to the current vehicle location.

Figure 3B:
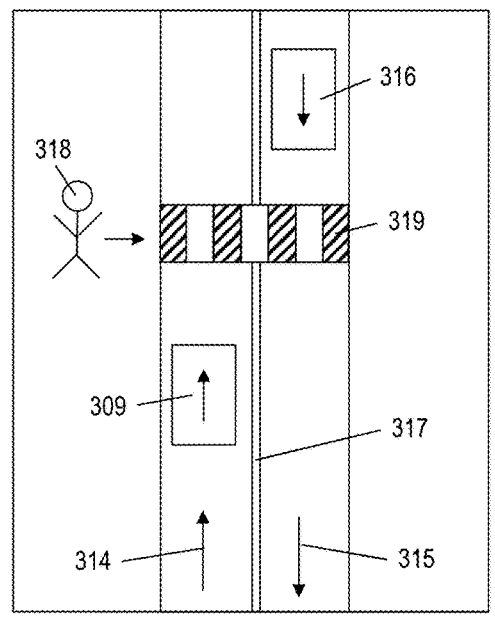
FIG. 3b illustrates schematically examples of contextual data for use in assessing manoeuvering obstruction.

FIG. 3b illustrates schematically some examples of contextual data for use in assessing manoeuvering obstruction. The manoeuvering obstruction criterion assesses whether or not there are any physical obstructions which may hinder or prevent a U-turn at a particular location, such as moving or stationary vehicles 316, central reservations 317 or pedestrians 318. In this respect, suitable contextual data may include the presence of any moving or stationary vehicles 316 on the road in proximity to the current vehicle location, the presence of a central reservations 317 separating inbound 314 and outbound 315 lanes in proximity to the current vehicle location, and/or the presence of a pedestrian 318 or pedestrian crossing 319 in proximity to the current vehicle location. The presence of central reservations 317 and pedestrian crossings 319 may be determined from map data, whilst real-time data from proximity or motion sensors, such as the radar, laser scanner, light radar, ultra sound radar and/or camera, and/or the vehicle-to-vehicle (V2V) communication data may be used to detect the presence of any proximal vehicles 316 or pedestrians 318. In the case of a single carriageway, the sensors would typically be configured to detect the presence of vehicles on the outbound lane 314 of the carriageway, whilst for dual carriageways and motorways, they may be configured to monitor both the inbound 314 and outbound 315 lanes due to the possibility of traffic 316 on one or more adjacent inbound lanes of the carriageway/motorway.

Figure 3C:
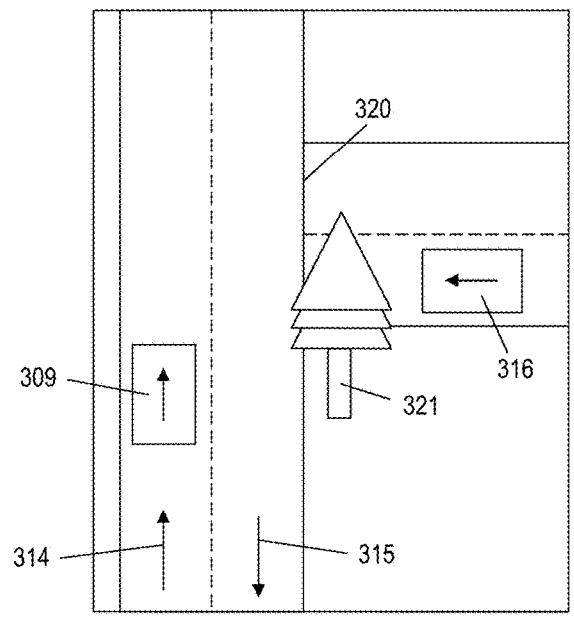
FIG. 3c illustrates schematically examples of contextual data for use in assessing manoeuvering safety.

FIG. 3c illustrates schematically some examples of contextual data for use in assessing manoeuvering safety. The manoeuvering safety criterion assesses whether or not it is safe to perform a U-turn at a particular location, regardless of any legal restrictions or otherwise. There are a number of features associated with a particular location which may affect safety, such as road geometry, road layout and visibility. For example, it would generally be considered to be safer to perform a U-turn on a straight section of road than on a bend. Similarly, it may be considered to be relatively unsafe to perform a U-turn in proximity to a road intersection 320 (e.g. a junction, a crossroad, a roundabout, an interchange, an onramp, an off-ramp, a road or lane merge, and a road or lane split), or at a location where it is impossible to see oncoming traffic 316, parked vehicles 313 or pedestrians 318 due to physical obstructions 321 or adverse weather conditions. In this respect, suitable contextual data for consideration by the apparatus 101 may include the geometry of the road in proximity to the current vehicle location, the presence of a road intersection 320 in proximity to the current vehicle location, and the presence of a visibility obstruction 321 in proximity to the current vehicle location. The road geometry, road intersections 320 and permanent visibility obstructions 321 (e.g. buildings, trees or geological features) may be determined from map data, but alternative data types may be required in order to detect other obstructions. For example, light sensor, radar, laser scanner, light radar, ultra sound radar, camera, transmissometers and/or forward scatter visibility sensors may be used to provide information on atmospheric visibility, whilst proximity or motion sensors may be used to detect the presence of temporary obstructions such as vehicles 313, 316 and pedestrians 318.

Figure 3D:
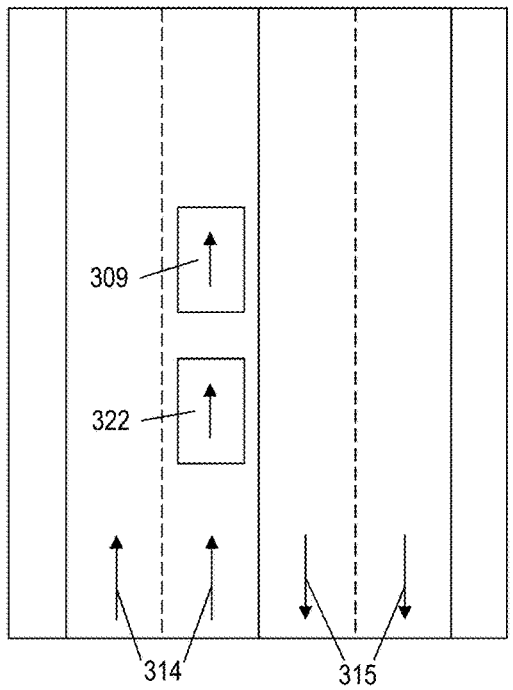
FIG. 3d illustrates schematically examples of contextual data for use in assessing manoeuvering convenience.

FIG. 3d illustrates schematically some examples of contextual data for use in assessing manoeuvering convenience. Rather than helping to determine whether or not a U-turn can be physically, safely or legally performed at a particular location, the manoeuvering convenience criterion is concerned with whether such a manoeuvre would inconvenience other road users. For example, even if it is determined that a U-turn could be performed safely and legally at a particular location, it may still be considered to be inappropriate if it would involve holding up traffic 322 behind the vehicle 309 or on the other side of the road (in-front of the vehicle). This situation may arise, for example, at peak time on a single carriageway (especially in a traffic jam) where such a manoeuvre could potentially induce road rage in other drivers. On the other hand, the impact of the manoeuvre on traffic flow may be reduced if there are multiple inbound 314 and/or outbound 315 lanes.

In order to assess the convenience of a U-turn, therefore, the apparatus 101 may be configured to consider the presence of traffic 322 behind the vehicle 309, or on the other side of the road, in proximity to the current vehicle location, in addition to the number of inbound 314 and outbound 315 lanes forming the road in proximity to the current vehicle location. The presence of other vehicles 322 may be determined from proximity or motion sensor data, such as the radar, laser scanner, light radar, ultra sound radar, camera, and the number of lanes 314, 315 may be determined from map data.

Figure 3E:
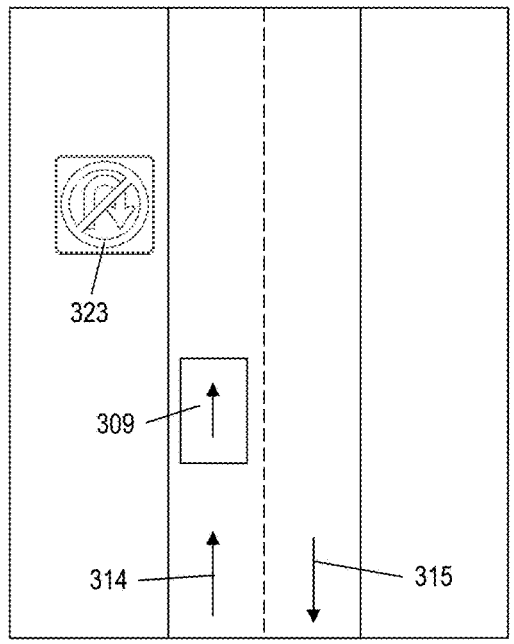
FIG. 3e illustrates schematically an example of contextual data for use in assessing manoeuvering legality.

FIG. 3e illustrates schematically one example of contextual data for use in assessing manoeuvering legality. This criterion takes account of legal traffic restrictions 323 (e.g. U-turns prohibited) in force at a particular location which could prevent U-turns from being performed. Such restrictions 323 may be defined by rules or signage, and may be permanent or temporary. For example, U-turns may be permanently banned on a particular stretch of road due to the typical traffic speed or congestion. On the other hand, the occurrence of road works may render it temporarily unsafe to perform a U-turn at that particular location. In order to account for such legal restrictions 323, the apparatus 101 may be configured to dynamically identify a U-turn location based on consideration of the presence of a predefined legal traffic restriction 323 in proximity to the current vehicle location. Such contextual data may be obtained from map data or from a traffic update, depending on how recently the predefined legal traffic restriction 323 came into force. In certain embodiments, sensors may be used to read road signs to determine predefined legal traffic restrictions 323.

In practice, identification of a suitable U-turn location may be achieved in a number of different ways. For example, a scoring system may be used in which each location under consideration is assigned a score based on how the contextual data compares with the one or more predefined manoeuvering criteria. In this scenario, a point could be added or subtracted for any aspect which hinders or inhibits the completion of a U-turn, and the resulting score could then be compared with a predefined maximum or minimum threshold to determine whether the location is suitable for performing a U-turn or not. For example, in a scoring system where points are added for negative manoeuvering conditions, a location would only be deemed suitable for performing a U-turn if the resulting score was below the predefined maximum threshold. Similarly, in a scoring system where points are subtracted for negative manoeuvering conditions, a location would only be deemed suitable for performing a U-turn if the resulting score was above the predefined minimum threshold. Furthermore, in cases where multiple locations were determined to be suitable for performing a U-turn in proximity to the current vehicle location, the apparatus may be configured to identify the location with the lowest or highest score (respectively) as the U-turn location.

Given that some manoeuvering criteria are more serious than others, certain locations may be deemed to be unsuitable for use in performing a U-turn as soon as a particular condition is determined from the contextual data. For example, if it is determined that it is impossible to see oncoming traffic at a given location, then this location may automatically be ruled out as a potential candidate due to the associated safety risk. A similar approach may apply to any location where U-turns are legally prohibited. On the other hand, a location which is determined to be suitable based on manoeuvering safety and legality may not necessarily be ruled out on the basis of inconvenience to other road users.

As mentioned previously, once the apparatus has used the contextual data to dynamically identify a U-turn location on the planned route of travel, it provides an indication of the dynamically identified U-turn location for use in route navigation onto a different route of travel. In some cases, however, it may not be immediately obvious how best to perform a U-turn at the identified U-turn location. For example, it may be possible to complete the U-turn as an n-point turn requiring at least three linked manoeuvres. In this scenario, a driver (e.g. of a manual vehicle) or operator (e.g. of a remote-controlled vehicle) of the vehicle may be confused as to whether he/she should perform a three-point turn or a five-point turn. Furthermore, in the event that the manoeuvre will be relatively tight, it may be necessary to change to an inbound lane which is further from the outbound lanes in order to perform the U-turn, which may or may not be obvious to the driver or operator at the time.

To help reduce this confusion and aid the driver/operator in performing the U-turn, the apparatus may also be configured to determine how to perform the U-turn at the U-turn location based on the contextual data, and provide an indication of how to perform the U-turn for use in guiding the vehicle from the planned route of travel onto the different route of travel. Determining how to perform the U-turn may comprise determining one or more of a minimum number of manoeuvres required to perform the U-turn, an inbound lane at the U-turn location in which to initiate the U-turn, and/or an outbound lane at the U-turn location in which to complete the U-turn. In the case of driverless vehicles, this indication may be presented to the driverless vehicle to guide it in performing the U-turn.

The indication of how to perform the U-turn may comprise one or both of a visual (i.e. graphical) and audio indication. For example, the visual indication may comprise markers, lines, arrows and/or zones displayed on a head-up-display (HUD) or a virtual reality view embedded or attached in a dashboard, and the audio indication may comprise oral instructions, configured to guide the vehicle from the planned route of travel onto the different route of travel (in the case of driver vehicles in particular).

Figure 4:
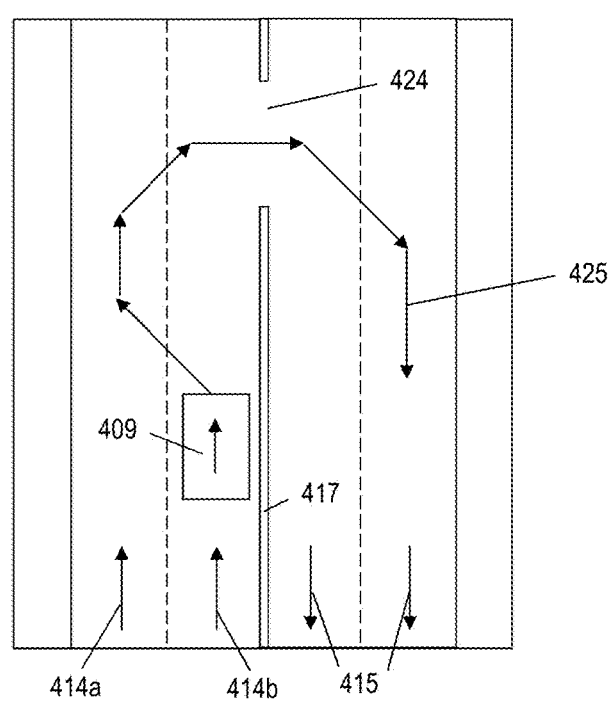
FIG. 4 illustrates schematically an indication of how to perform a U-turn at a particular location on the planned route of travel.

FIG. 4 illustrates schematically an indication of how to perform a U-turn at a particular location on the planned route of travel. In this example, the vehicle 409 is currently in the right-hand lane 414b of a dual carriageway, and in some situations, e.g. due to the relatively small gap 424 in the central reservation 417 and/or restricted manoeuvering space on the lanes 415, the U-turn would be best initiated from the left-hand lane 414a. As a result, the apparatus 101 has provided one or more visual indications, e.g. comprising one or more arrows 425 onto a map view, on the HUD and/or the virtual reality view, which shows the driver/operator of the vehicle 409 how to perform the manoeuvre. In another example, the arrows 425 may be replaced or supplemented with coloured zones overlaid onto the map. For example, a green zone (possibly surrounded by red zones) may be used to define a region within which the vehicle 409 must remain in order to complete the U-turn successfully.

Given that the U-turn location is identified dynamically, it follows that the indication of an identified U-turn location, and possibly the associated indication of how to perform the U-turn at the identified U-turn location, is updated as the current vehicle location changes. In this respect, the apparatus 101 is configured to identify and indicate a new U-turn location when it detects that the vehicle 409 has bypassed a previously identified U-turn location. In addition, the apparatus 101 may be configured to determine an alternative way of performing the U-turn when it detects that the vehicle 409 has significantly deviated from the proposed path 425.

Figure 5:
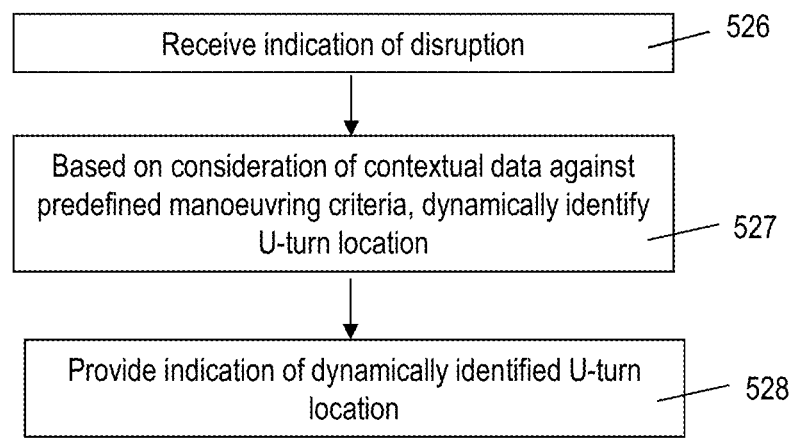
FIG. 5 illustrates schematically the main steps of a method described herein.

FIG. 5 illustrates schematically the main steps 526-528 of the method described herein. The method generally comprises: receiving an indication of disruption to a planned route of travel for a road vehicle following the planned route 526; based on consideration of contextual data in respect of a location in proximity to the current vehicle location against one or more predefined manoeuvering criteria, dynamically identifying a U-turn location on the planned route of travel at which it is possible for the vehicle to perform a U-turn onto a different route of travel 527; and providing an indication of the dynamically identified U-turn location and/or determined one or more U-turn manoeuvres for use in route navigation onto the different route of travel 528. The road vehicle may include a car, van, bus, motorbike or bicycle and the like.

Figure 6:
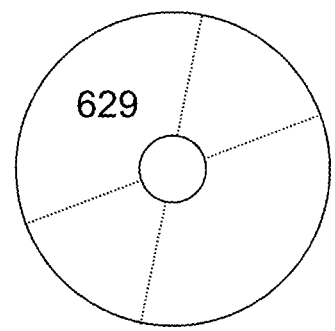
FIG. 6 shows a computer-readable medium comprising a computer program configured to perform, control or enable one or more methods described herein.

FIG. 6 illustrates schematically a computer/processor readable medium 629 providing a computer program according to one embodiment. The computer program may comprise computer code configured to perform, control or enable one or more of the method steps 526-528 of FIG. 5. In this example, the computer/processor readable medium 629 is a disc such as a digital versatile disc (DVD) or a compact disc (CD). In other embodiments, the computer/processor readable medium 629 may be any medium that has been programmed in such a way as to carry out an inventive function. The computer/processor readable medium 629 may be a removable memory device such as a memory stick or memory card (SD, mini SD, micro SD or nano SD).

Figure 7:
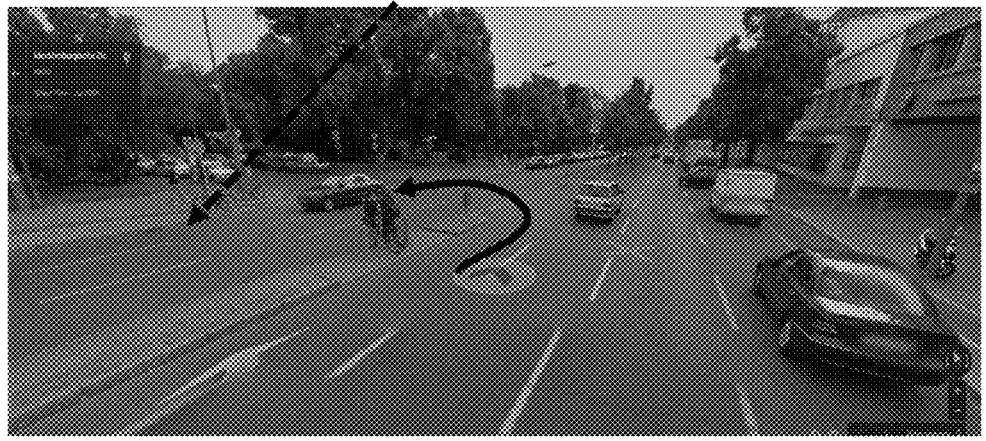
FIG. 7 shows a scenario where a U-turn might not be straightforward and a visual indication of a U-turn location.
Figure 8:
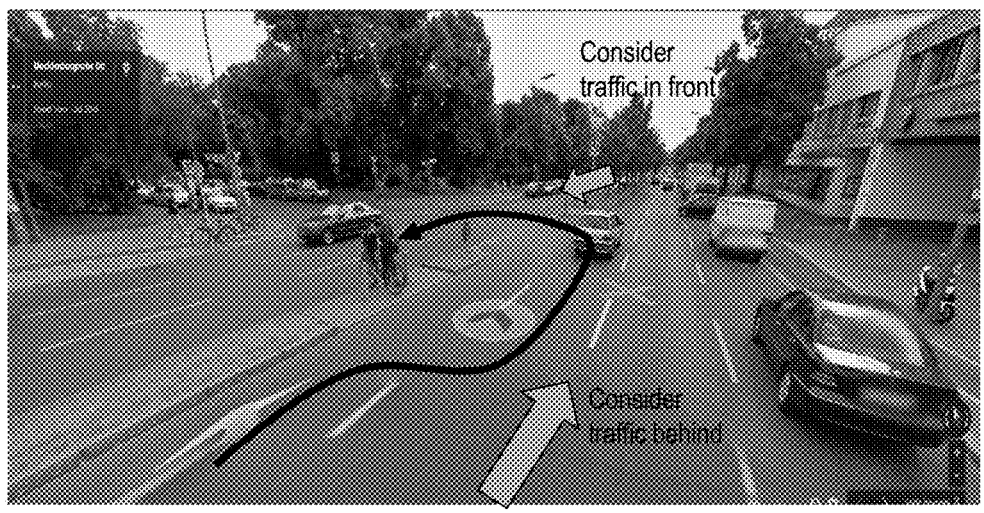
FIG. 8 shows an example of visual guidance in the case of a lane change being required.
Figure 9:
FIG. 9 shows an example of visual guidance for a driver to support a U-turn manoeuver.
Figure 10:
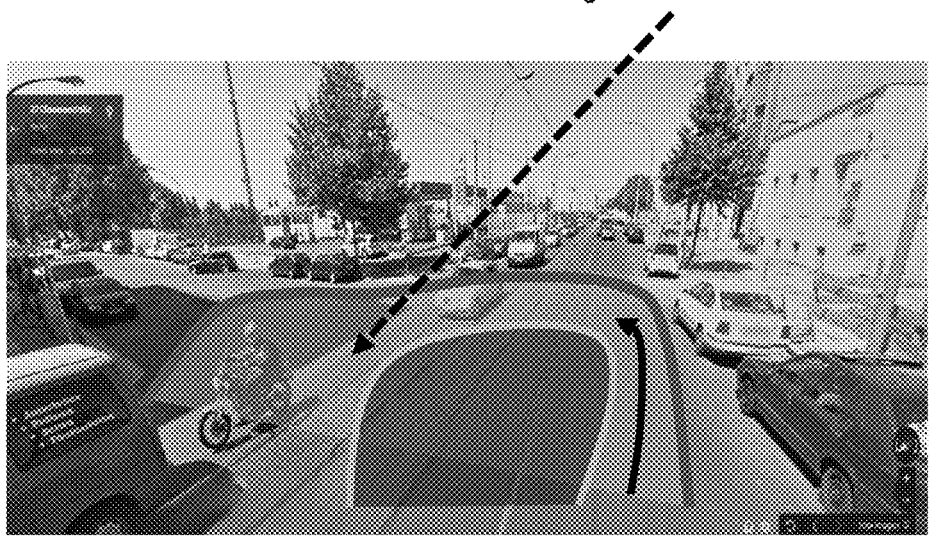
FIG. 10 shows another example of visual guidance for a driver to support a U-turn.

FIGS. 7-10 give visual representations of some of the examples described previously. For example, FIG. 7 gives an example of where a U-turn might not be straightforward and based, on sensor data, a determination can be made as to whether the manoeuvering criteria has been met, in this case a maneuvering obstruction criteria (as in relation to FIG. 3*b*). Similarly, FIG. 8 gives a visual depiction of manoeuvering convenience, manoeuvering space and manoeuvering safety considerations. Consideration is given to one or more of traffic behind and in-front of the vehicle (see examples in relation to FIG. 3*d* (inconveniencing other drivers), safe breaking distance for cars behind if changing lanes and cars ahead coming in the opposite direction, and space issues (as per FIG. 4, in relation to manoeuvering space criteria) to allow movement out of the current lane to allow for the turning circle of the vehicle so a single continuous U-turn manoeuvre can be made (thereby minimising disruption/safety in respect of oncoming traffic). FIGS. 9 and 10 given visual representations, similar to discussions in relation to FIG. 4, where U-turn zones can be defined for a driver.

It will be appreciated that crowd-sourcing sensor data can be used to identify U-turn locations, for example, based on how long it has previously taken users to perform U-turns at particular locations. If the time is sufficiently short, it could be judged to meet one or more of the manoeuvering criteria.

Availability of a public transport lane may be used to influence whether the manoeuvering criteria has been met. For example, the extra space available for the U-turn manoeuvre may be used as a positive criterion to identify the location of a U-turn (given the increased chance of a single continuous U-turn manoeuvre). Restrictions on availability of bus-lanes can be used to negative influence the identification of a U-turn location. The time dependency of the restrictions can be used to change between positive and negative influencing of available U-turn locations (e.g. at times when no restriction is placed on the bus lane, allow use of the bus lane in positively influencing the identification of a U-turn location and at times when there is a restriction, not allowing the bus lane to positively influence the identification of a U-turn location.

Multiple U-turn location indications can be given, which could include the indication of the subsequent available U-turn location if the next available U-turn location is not taken. This subsequent indication could be one or more of time to or distance to subsequent available U-turn location to allow informed choice as to whether the next available U-turn location should be taken.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    at least one processor; and
    at least one memory including computer program code for one or more programs,
    the at least one memory and the computer program code configured to, with the at least one processor, cause the apparatus to perform at least the following,
    receive an indication of disruption to a planned route of travel for a road vehicle following the planned route;
    based on of real-time contextual data in respect of a location in proximity to a current vehicle location against one or more predefined maneuvering criteria to perform a U-turn onto a different route of travel, identify a U-turn location on the planned route of travel for the vehicle to perform the U-turn, wherein the real-time contextual data includes one or more temporary maneuvering obstructions that are external to the vehicle and determined via real-time sensor data; and
    provide an indication of the U-turn location for route navigation onto the different route of travel.

2. The apparatus of claim 1, wherein the one or more predefined maneuvering criteria comprise a maneuvering space, and wherein the apparatus is configured to identify the U-turn location based on the size or shape of the vehicle, the width of the road in proximity to the current vehicle location, and the presence of the one or more temporary maneuvering obstructions at the side of the road in proximity to the current vehicle location.

3. The apparatus of claim 1, wherein the one or more predefined maneuvering criteria comprise the one or more temporary maneuvering obstructions,
    wherein the one or more temporary maneuvering obstructions include one or more moving vehicles, one or more parked vehicles, one or more moving pedestrians, one or more stationary pedestrians, or a combination thereof, and
    wherein the apparatus is configured to identify the U-turn location based on a presence of a moving or stationary vehicle on the road in proximity to the current vehicle location, a presence of a central reservation separating inbound and outbound lanes in proximity to the current vehicle location, and a presence of a pedestrian or pedestrian crossing in proximity to the current vehicle location.

4. The apparatus of claim 1, wherein the one or more predefined maneuvering criteria comprise maneuvering safety, and wherein the apparatus is configured to identify the U-turn location based on consideration of at least one of the following pieces of contextual data: the geometry of the road in proximity to the current vehicle location, the presence of a road intersection in proximity to the current vehicle location, and the presence of a visibility obstruction in proximity to the current vehicle location.

5. The apparatus of claim 1, wherein the one or more predefined maneuvering criteria comprise maneuvering convenience,
    wherein the vehicle is autonomous or semi-autonomous, and
    wherein the apparatus is configured to identify the U-turn location based on consideration of at least one of the following pieces of contextual data: a number of inbound and outbound lanes forming the road in proximity to the current vehicle location, and a presence of traffic behind the vehicle or on the other side of the road in proximity to the current vehicle location.

6. The apparatus of claim 1, wherein the one or more predefined maneuvering criteria comprise maneuvering legality,
   wherein one or more temporary maneuvering obstructions include one or more weather conditions, and
   wherein the apparatus is configured to identify the U-turn location based on consideration of the presence of a predefined legal traffic restriction in proximity to the current vehicle location.

7. The apparatus of claim 1, wherein the apparatus is configured to:
   determine how to perform the U-turn at the U-turn location based on the real-time contextual data; and
   provide an indication of how to perform the U-turn for guidance from the planned route of travel onto the different route of travel,
   wherein the disruption is determined using the real-time sensor data.

8. The apparatus of claim 7, wherein determining how to perform the U-turn comprises determining one or more of a minimum number of maneuvers required to perform the U-turn, an inbound lane at the U-turn location in which to initiate the U-turn, and an outbound lane at the U-turn location in which to complete the U-turn.

9. The apparatus of claim 7, wherein the indication of how to perform the U-turn comprises one or more of a visual indication, an audio indication, and computer readable instructions for a driverless vehicle to perform the U-turn.

10. The apparatus of claim 9, wherein the visual indication comprises one or more of markers, lines, arrows and zones, and the audio indication comprises instructions, configured to provide guidance from the planned route of travel onto the different route of travel.

11. The apparatus of claim 1, wherein disruption to the planned route of travel comprises one or more of a deliberate change in route to the same destination or a deliberate change to a different destination, a traffic incident in respect of the planned route of travel including one or more of a road or lane closure, a road or lane blockage, a traffic accident, a vehicle breakdown and road works on the planned route, and adverse weather conditions on the planned route.

12. The apparatus of claim 1, wherein the indication of disruption is received via an operator located remote to the apparatus or vehicle, a traffic update, a weather update, or a combination thereof.

13. The apparatus of claim 1, wherein the contextual data is in respect of a location within a predefined distance of the current vehicle location on the planned route of travel, or a predefined distance on the planned route before the location of the disruption.

14. The apparatus of claim 13, wherein the predefined distance is one or more of 100 ft, 100 yd, 100 m, 200 ft, 200 yd, 200 m, 300 ft, 300 yd, 300 m, 500 ft, 500 yd, 500 m, 1 km and 1 mile of the current vehicle location or disruption.

15. The apparatus of claim 1, wherein the indication of the U-turn location is configured for use by one or more of a driver or passenger of the vehicle, an operator associated with and located remote to the apparatus or vehicle, and the vehicle itself.

16. The apparatus of claim 1, wherein the apparatus is one or more of an electronic device, a portable electronic device, a portable telecommunications device, a satellite navigation device, a mobile phone, a personal digital assistant, a tablet, a phablet, a desktop computer, a laptop computer, a server, a smartphone, a smartwatch, smart eyewear, a heads-up display for the vehicle, the vehicle itself, a driver vehicle, a driverless vehicle, and a module for one or more of the same.

17. The apparatus of claim 1, wherein the real-time contextual data comprises information on aspects of the road network in proximity to the current vehicle location which vary with time.

18. The apparatus of claim 17, wherein the real-time contextual data comprises information on aspects of the road network in proximity to the current vehicle location which vary with time including one or more of moving, stationary or parked vehicles, pedestrians and weather conditions.

19. A method comprising:
   receiving, by an apparatus, an indication of disruption to a planned route of travel for a road vehicle following the planned route;
   based on real-time contextual data in respect of a location in proximity to a current vehicle location against one or more predefined maneuvering criteria to perform a U-turn onto a different route of travel, identifying, by the apparatus, a U-turn location on the planned route of travel for the vehicle to perform the U-turn, wherein the real-time contextual data includes one or more temporary maneuvering obstructions that are external to the vehicle and determined via real-time sensor data; and
   providing, by the apparatus, an indication of the U-turn location for route navigation onto the different route of travel.

20. A non-transitory computer-readable storage medium carrying one or more sequences of one or more instructions which, when executed by one or more processors, cause an apparatus to at least perform the following steps:
   receiving an indication of disruption to a planned route of travel for a road vehicle following the planned route;
   based on real-time contextual data in respect of a location in proximity to a current vehicle location against one or more predefined maneuvering criteria to perform a U-turn onto a different route of travel, identifying a U-turn location on the planned route of travel for the vehicle to perform the U-turn, wherein the real-time contextual data includes one or more temporary maneuvering obstructions that are external to the vehicle and determined via real-time sensor data; and
   providing an indication of the U-turn location for route navigation onto the different route of travel.

* * * * *